Patented Feb. 5, 1952

2,584,413

UNITED STATES PATENT OFFICE 2,584,413

CLEANING AND POLISHING COMPOSITION

Maurice E. Baer, Boston, and Leo E. Concannon, Waban, Mass.; said Baer assignor to said Concannon No Drawing. Application June 30, 1948, Serial No. 36,286

3 Claims. (Cl. 106—11)

This invention relates to a liquid composition for use as a cleaning and polishing agent.

The composition constituting the invention is particularly desirable for use in acting as a combined cleaning agent and finish polish for smooth surfaces. The ingredients of the composition facilitate the initial removal of grime, dirt, dust and other substances that may be marring the finish, after which, upon evaporation of the volatile ingredients, the surface will be coated with a very thin, tightly bonded film of such smoothness as to produce a very high gloss. The composition may be satisfactorily used with practically all types of finishes now currently available on automobiles, furniture and other articles having smooth surfaces which are subject to normal cleaning and polishing.

The composition comprises an oil phase, a water phase, and an emulsifier, which makes it possible to produce a satisfactory suspension, preferably of the oil phase in the water phase. The oil phase is formed by the mixture of a silicone fluid, such as a silicone oil, and a suitable hydrocarbon, as, for example, various volatile petroleum solvents or related coal tar derivatives. The terms "silicone fluid" and "silicone oil" as used in this specification refer to silicone polymers of the character disclosed in a publication entitled "Dow Corning Fluids" published by Dow Corning Corporation, Midland, Michigan, and cataloged in the library of the United States Patent Office on February 17, 1945.

The emulsifier may be any one of a number of available emulsifiers known as being capable of bringing about the proper dispersion of this particular oil phase in the water phase. We prefer to use a cationic emulsifier alone or in combination with a non-ionic type. The resulting cationic emulsion deposits the silicone polishing agent more rapidly onto the treated surface and bonds it more tenaciously than would be the case were an anionic or nonionic agent used.

The volatile hydrocarbon solvent used with the silicone oil to form the oil phase should be sufficiently volatile so that it will evaporate along with the water in a reasonable time after application to the surface to be treated.

In the preparation of the composition, the silicone oil and the volatile hydrocarbon solvent are mechanically mixed to produce the oil phase. To this is added the emulsifier, after which the water is slowly added to the oil phase, followed by constant high speed agitation which produces the final product, a stable emulsion. A colloid mill may be used in place of high speed agitation, but in either case the product is satisfactory.

The oil phase, being a mixture of silicone oil and a volatile hydrocarbon solvent, by itself acts as a fine polishing composition, but due to its relatively small bulk and high cost compared with the final emulsion which includes the water phase, it is not recommended for use as an initial cleaner. Of course, it will be understood that the oil phase will act as a cleaner as well as a polish, but if used in this manner, the cost would be very high. The volatile hydrocarbon solvent in the oil phase is particularly helpful in dissolving oils, greases and other foreign materials that may be found on the surface to be treated.

If desired, the composition may be prepared from silicone oil alone as the oil phase combined with the emulsifier and the water phase. In this composition the volatile hydrocarbon solvent is omitted. The cleaning effect due to the omission of the volatile hydrocarbon solvent is diminished, but the polishing characteristics remain, as the silicone oil is the active agent for producing the thin light-reflecting film over the surface being cleaned and polished.

In the preferred form of the invention already described that includes the silicone oil, volatile hydrocarbon solvent, and water all brought into a stable emulsion through the use of the emulsifier, the water gives the necessary bulk and general dirt-loosening effect, which is aided by the wetting action of the emulsifier and materially assisted by the volatile hydrocarbon solvent, the latter helping to dissolve and remove the more stubborn elements. Both of these liquids, being readily volatile, soon disappear to leave the silicone oil film on the surface.

The emulsifier used in the present composition is cationic in character. The cation-active agents used in this invention may be of an aliphatic, carbocyclic, or heterocyclic nature. When these agents are of an alkaline nature, they should preferably be used in the form of their salts, for example, acetates, formates, or hydrochlorides. The aliphatic bases should have a chain length of at least six carbons and preferably 10 to 18 carbons. We prefer to use octadecyl amine acetate, although it is to be understood that, with respect to the cationic emulsifier used in the present invention, the amine salts such as acetate, amine formate, and amine hydrochloride may be considered as full equivalents. The cationic agent, because of its greater selectivity toward the many negatively charged and generally polished surfaces with which the composition will be used, deposits and binds the dispersed phase of silicone oil to the treated surface with great efficiency and tenacity, thus forming a dry lustrous protective film.

The dilution of the silicone oil by the volatile hydrocarbon solvent and water makes possible the easy spreading over a large area of a very thin silicone oil film. Without the dilution the deposited film would be oily rather than hard and dry.

In the examples given hereafter of the various proportions of silicone oil, volatile hydrocarbon solvent and water, it is to be understood that only a small quantity of the cationic emulsifier is used in every case. In general, the amount of emulsifier in relation to the total of all the other ingredients will be in the order of from one-tenth of one per cent to 12 per cent, although a two per cent concentration based on the oil phase only is recommended.

If the oil phase alone is used, suitable proportions by volume are as follows: silicone oil, 0.5 to 15 per cent, hydrocarbon, 99.5 to 85 per cent. No emulsifier is required.

If the emulsion without the hydrocarbon is preferred, the proportions will be: silicone oil, 0.5 to 10 per cent, water, 99.5 to 90 per cent, plus the emulsifier in sufficient quantity to achieve the proper emulsification through very high speed agitation or use of the colloid mill.

In the preferred form, which includes both the silicone oil and hydrocarbon in the oil phase, the proportions will be: silicone oil, 0.5 to 15 per cent, hydrocarbon, 75 to 10 per cent, water, 24.5 to 75 per cent, plus the emulsifier in sufficient quantity to cause the proper emulsification through high speed agitation or the use of the colloid mill.

The following is illustrative of one use to which the composition has been put with success. In the cleaning and polishing of automobiles very satisfactory results have been obtained by wiping the surface with a soft pad saturated with the emulsion, and then lightly wiping before complete drying with a dry cloth to obtain a high lustre. The combination has the advantages of giving a non-greasy, high polish and slip to the treated surface without labor, of eliminating the need of washing automobile surfaces except in extreme cases, and of giving a weatherproof finish at least comparable to high-grade wax coatings.

We claim:

1. A cleaning and polishing oil-in-water emulsion, comprising an oil phase consisting of 0.5 to 15% silicone oil and 75 to 10% volatile hydrocarbon solvent, 24.5 to 75% water, and 0.1 to 12% cationic emulsifying agent.

2. A cleaning and polishing oil-in-water emulsion, comprising an oil phase consisting of 0.5 to 15% silicone oil and 75 to 10% volatile hydrocarbon solvent, 24.5 to 75% water, and 0.1 to 12% of an alkyl amine salt having an alkyl chain of from $C_6$ to $C_{18}$.

3. A cleaning and polishing oil-in-water emulsion, comprising an oil phase consisting of 0.5 to 15% silicone oil and 75 to 10% volatile hydrocarbon solvent, 24.5 to 75% water, and 0.1 to 12% of octadecyl amine acetate.

MAURICE E. BAER.
LEO E. CONCANNON.

REFERENCES CITED

The following references are of record in the file of this patent:

UNITED STATES PATENTS

| Number | Name | Date |
| --- | --- | --- |
| 2,274,807 | Rawlins et al. | May 3, 1942 |
| 2,386,259 | Norton | Oct. 9, 1945 |
| 2,392,805 | Biefeld | Jan. 15, 1946 |
| 2,406,671 | Diamond | Aug. 27, 1946 |
| 2,416,503 | Trautman et al. | Feb. 25, 1947 |
| 2,447,483 | Baker et al. | Aug. 24, 1948 |
| 2,470,772 | Hass | May 24, 1949 |

OTHER REFERENCES

Dow Corning Fluids, 8 pages, February 17, 1945; publication of Dow Corning Corp.

Transaction of American Institute Elect. Engineers, Apr. 7, 1945. Reprint of Kauppi et al. article, Organic Silicon Compounds for Insulating Electric Machines.

Johannson et al.: Proceedings of the Institute of Radio Eng. and Waves and Electrons, vol. 35, No. 5, May 1946, pages 296–297.